United States Patent [19]

Kahr

[11] Patent Number: 5,704,454
[45] Date of Patent: Jan. 6, 1998

[54] FATIGUE AND IMPACT RESISTANT RAILWAY BRAKE SHOE

[75] Inventor: Joseph C. Kahr, Southern Pines, N.C.

[73] Assignee: Westinghouse Air Brake Company, Wilmerding, Pa.

[21] Appl. No.: 625,179

[22] Filed: Mar. 29, 1996

[51] Int. Cl.$^6$ .................................................. F16D 65/04
[52] U.S. Cl. .................................................. 188/247; 403/41
[58] Field of Search .................................. 188/29, 57, 73.1, 188/73.31, 238–242, 250 B, 250 E, 250 G, 250 R, 252, 253, 258, 261, 264 G; 403/41

[56] References Cited

U.S. PATENT DOCUMENTS

| | | | |
|---|---|---|---|
| 1,095,297 | 5/1914 | Thompson | 188/239 |
| 1,177,440 | 10/1916 | Richardson | 188/248 |
| 1,328,596 | 1/1920 | Savgent | 188/248 |
| 2,885,037 | 5/1959 | Wilson | 188/247 |
| 5,341,904 | 8/1994 | Christie | 188/250 B |

FOREIGN PATENT DOCUMENTS

| 370433 | 8/1963 | Germany | 188/247 |
|---|---|---|---|
| 698305 | 11/1965 | Italy | 188/250 D |

*Primary Examiner*—Lee W. Young
*Assistant Examiner*—Chris Schwartz

[57] ABSTRACT

A bonded composition type railroad brake shoe is disclosed in which the keybridge cavity of the brake shoe backing plate is filled with composition brake lining material for reinforcement and dampening of the keybridge. An insert located in the keybridge cavity comprises a pair of spaced-apart ribs that are upturned from a base plate such that the insert partitions the keybridge cavity. The insert is bonded in place by the composition brake lining material, which is formed with a keyway by the insert. The insert further serves to reinforce the keybridge in conjunction with the composition brake lining material therein.

7 Claims, 3 Drawing Sheets

FATIGUE AND IMPACT RESISTANT RAILWAY BRAKE SHOE

BACKGROUND OF THE INVENTION

The present invention relates to brake shoes and particularly to composition lined brake shoes for railroad car brakes having a metal backing plate to which the composition brake shoe material is bonded.

Brake shoes of the aforementioned type are typically attached to a carrier member known as a brake head that may be mounted on the ends of a movable brake beam adjacent the wheel treads associated with a given axle of a railroad car truck. An opening in the brake head is adapted to receive a U-shaped keybridge that protrudes from the convex surface of the backing plate at its mid-section. Openings are provided in the keybridge via which a spring-type locking key is directed via a keyway in the brake head to affix the brake shoe to the brake head under spring tension of the locking key.

During braking, severe vibration forces and shock impacts due to irregular track and/or damaged wheel treads can occur at the interface between the brake head and backing plate, particularly when the brake shoe/brake head connection is not as tight as desired. Brake shoe failures have been attributed to deformation and collapse of the keybridge and, in extreme cases, fracture of the backing plate at the keybridge. Because of the keyholes provided in the keybridge, this is the weakest area of the backing plate and thus the area prone to collapse and/or fracture due to repetitive flexure of the backing plate incident to vibration and shock impacts. Should fracture occur across the width of the backing plate at this critical keyhole location, one-half of the brake shoe could become separated from the brake head. This seriously degrades brake effectiveness and unless serviced relatively soon, results in the brake head contacting the wheel with consequent damage to these parts.

Heretofore, backing plates have been strengthened in the keybridge area by welding a reinforcing plate A to the backing plate across the mouth of the keybridge, as shown in FIGS. 1 and 2 of the drawings. In this manner, backing plate flexure at the keybridge of a brake shoe having such reinforcing plate is reduced, making such brake shoes less susceptible to breakage. However, the welded connection of the reinforcing plate to the backing plate is not only expensive, but is prone to failure.

SUMMARY OF THE INVENTION

It is therefore an object of the present invention to prevent deformation and collapse of the backing plate keybridge of a brake shoe having a molded composition brake lining in a low-cost, yet effective manner.

It is an extension of the foregoing objective to strengthen the backing plate keybridge by bonding the composition material from which the brake shoe lining is molded to the backing plate within the keybridge area.

It is a further object of the invention to employ a metal insert in the keybridge cavity to form a keyway in the composition material with which the keybridge cavity is filled and to further strengthen the keybridge against deformation and collapse.

It is a still further object of the invention to provide a low-cost metal insert in accordance with the foregoing that can be affixed to the backing plate without welding.

In accordance with the present invention, there is provided a composition type brake shoe including a continuous metal braking plate to which a composition brake lining is bonded. The backing plate is formed with an upraised keybridge having keyholes to receive a locking key for affixing the brake shoe to a brake head. A composition brake lining is bonded to the backing plate, and the area within the keybridge cavity is filled with the composition brake lining material. This composition brake lining material substantially fills the keybridge cavity except for a keyway through which the locking key is inserted and thereby serves to dampen vibrations transmitted to the keybridge, and to further reinforce the keybridge against deformation and collapse.

BRIEF DESCRIPTION OF THE DRAWINGS

These and other objects and advantages of this invention will be apparent from the following more detailed explanation when taken in conjunction with the accompanying drawings in which.

DESCRIPTION AND OPERATION

Figure 1:
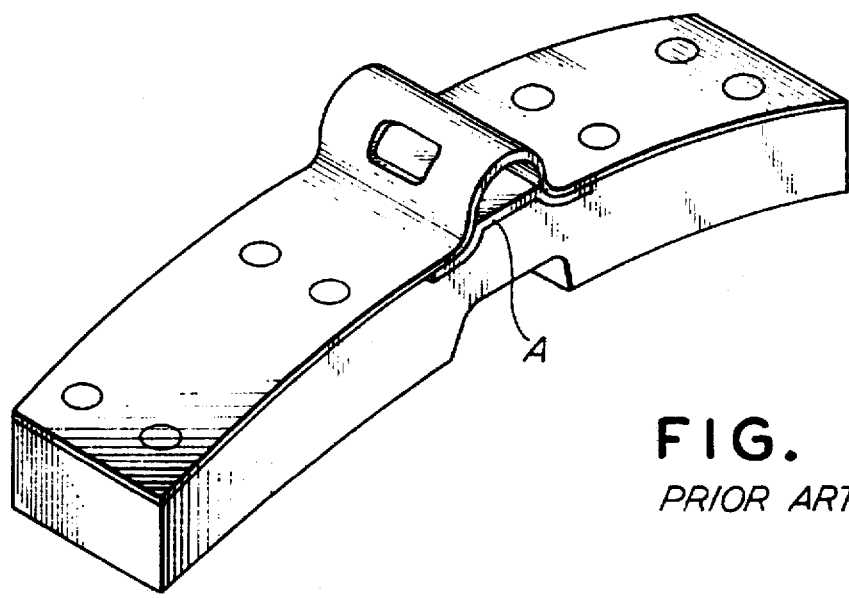
FIG. 1 is an axonometric view of a composition type railroad brake shoe having a metal reinforcing plate bridging the mouth of the backing plate key bridge, as known in the prior art.
Figure 2:
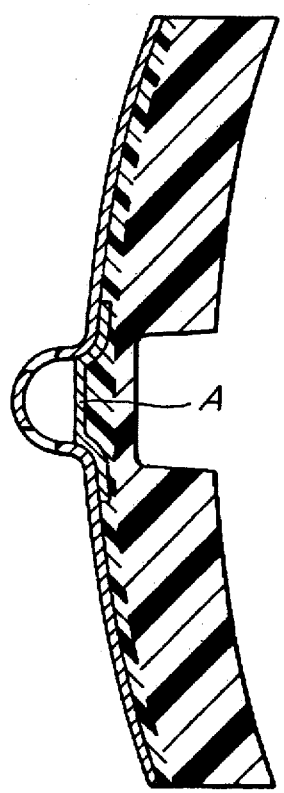
FIG. 2 is a sectional side elevation view of the prior art brake shoe of FIG. 1.
Figure 4:
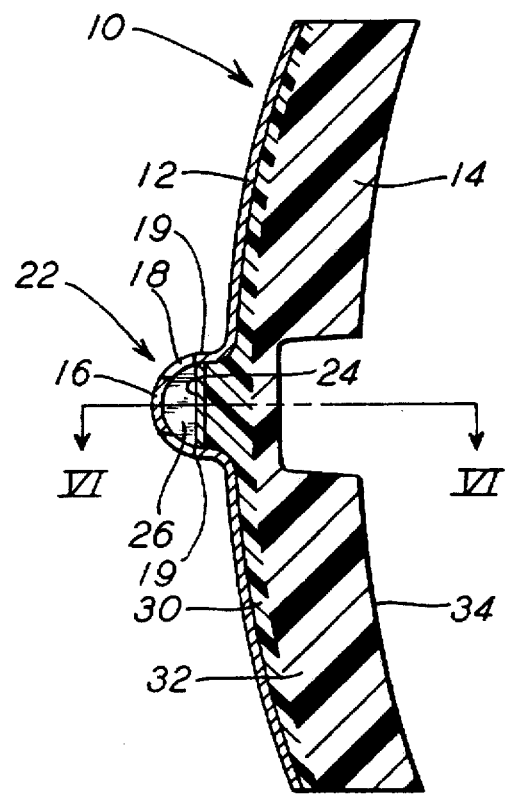
FIG. 4 is a sectional side elevation view of the brake shoe of FIG. 3.
Figure 3:
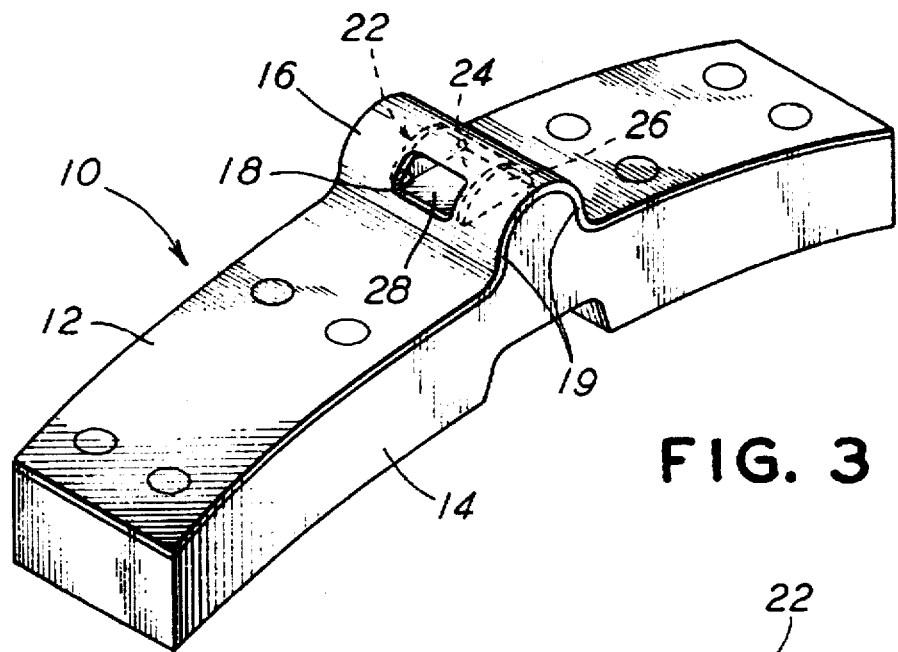
FIG. 3 is an axonometric view of a composition type railroad brake shoe having a metal insert in the cavity of the brake shoe keybridge that differs from the reinforcing plate in the prior art brake shoes.

Referring to FIGS. 3 and 4, there is disclosed a first embodiment of the invention in which a brake shoe 10 is shown comprising a continuous metal backing plate 12 to which a composition brake lining 14 is bonded. At its midsection, backing plate 12 forms an upraised keybridge 16 that is generally U-shaped. Each side of the keybridge 16 has a keyhole 18 to receive a spring type locking key (not shown) for securing the brake shoe to a brake head (not shown) under spring tension of the locking key. Being U-shaped, keybridge 16 has opposed legs 19 and a bight portion between which is formed a concavity 20 on the underside of backing plate 12 that extends the entire width of backing plate 12 and is open at the lateral ends thereof.

Figure 5:
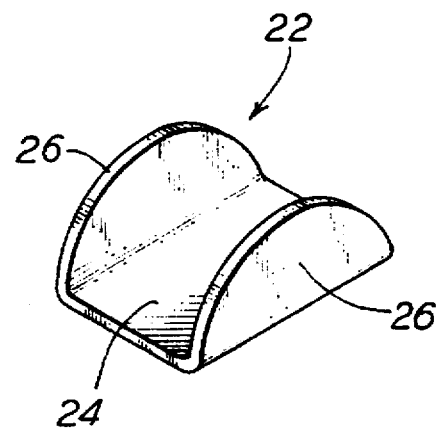
FIG. 5 is an enlarged axonometric view of one embodiment of the metal insert employed in the arrangement of FIGS. 3 and 4.

Located in keybridge concavity 20 and between legs 19 of keybridge 16 is a metal insert 22. As best viewed in FIG. 5, insert 22 comprises a generally rectangular base plate 24 and a pair of spaced-apart ribs 26 that are upturned from opposite sides of base plate 24. These ribs 26 are preferably integral with base plate 24, and may be formed by bending arcuate-shaped ends of a piece of sheet metal substantially 90°. The arcuate shape of each rib 26 conforms to the contour of the keybridge concavity 20 with which ribs 26 are thus contiguous. Insert 22 is located within concavity 20 so that the respective ribs 26 are disposed on opposite sides of the respective keyholes 18 and base plate 24 traverses the mouth of concavity 20 at a location in proximity with the bottom of keyholes 18, as viewed in FIG. 3.

Figure 6:
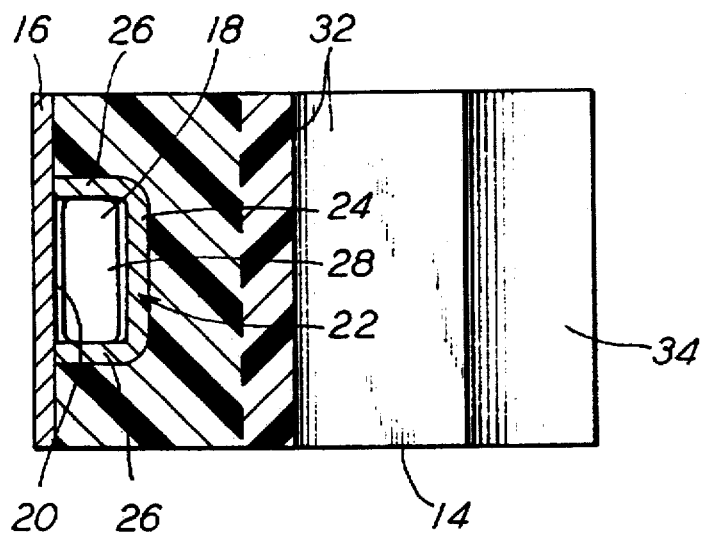
FIG. 6 is a section view taken along the lines VI—VI in FIG. 4.
Figure 7:
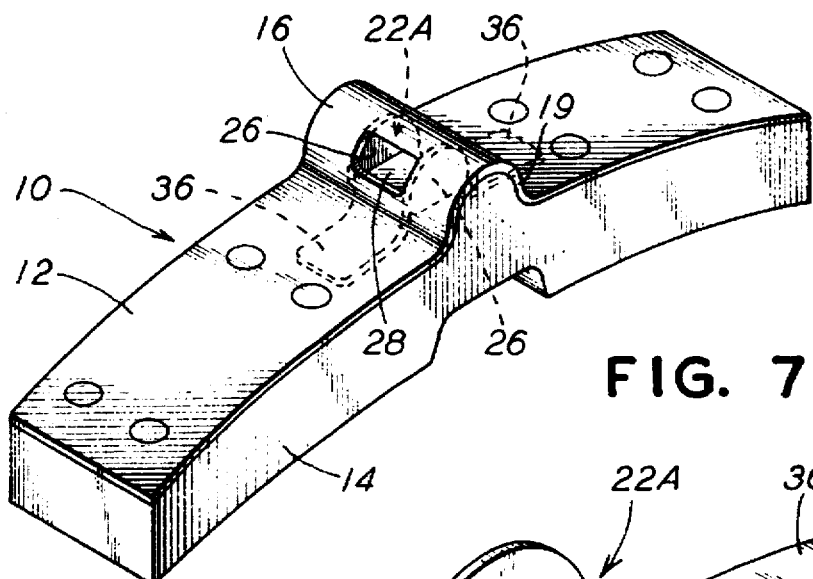
FIG. 7 is an axonometric view of a composition type railroad brake shoe having a metal insert in the cavity of the brake shoe keybridge that differs from the insert shown in FIGS. 3 and 5.

During molding of brake shoe 10, the composition material forming brake lining 14 fills concavity 20 in surrounding relationship with insert 22 and is bonded thereto, as well as to the backing plate, as shown in FIG. 6. It will be appreciated, therefore, that insert 22 is molded in place, while at the same time preventing brake lining material from entering the area of concavity 20 between ribs 26. Consequently, a keyway 28 is partitioned off by ribs 26 within concavity 20, such keyway 28 being formed in alignment with keyholes 18 in keybridge 16 to receive a brake shoe locking key.

In filling keybridge concavity 20 with composition brake lining material on opposite sides of ribs 26, and at the underside of base plate 24, as explained, it will be further appreciated that vibrations normally transmitted to the brake shoe backing plate 12, and more particularly to keybridge 16, are dampened. Moreover, the composition brake lining material within concavity 20 serves as a primary component in strengthening the keybridge 16. This primary component in the strengthening of keybridge 16 is reinforced by engagement of the ribs 26 and base plate 24 with the underside of backing plate 12 within the concavity of keybridge 16, specifically adjacent keyholes 18 therein, such keyholes 18 being the weakest area of backing plate 12 and thus the location most prone to deform, collapse and fracture.

It is well known in the molding of composition type brake shoes to employ a composition binder material for bending to the metal backing plate and to which a friction composition material is bonded. Is it therefore preferable in the present invention, as shown in FIG. 4, to utilize a composition binder material 30 adjacent the backing plate 12, including the area within concavity 20 but outside of ribs 26 of inset 22, such binder material being known to have high impact resistance, as well as a high bonding characteristic, which assures stability of metal insert 22 and effectively prevents flexing of the backing plate 12 in the vicinity of keyholes 18. The friction composition material 32 is molded to the binder material and forms a braking face 34 with which brake shoe 10 engages a railroad car wheel tread (not shown).

It is also within the scope of the present invention to bond the friction composition brake lining material 32 directly to backing plate 12 without utilizing composition binder material 30, in which case the friction composition material is also bonded directly to the metal insert 22 and provides the strengthening component for keybridge 16, which the metal insert reinforces.

In an alternate embodiment of the invention, as shown in FIGS. 7-10, a metal insert 22A similar to insert 22, is employed. Insert 22A comprises a generally rectangular base plate 24A, a pair of spaced-apart ribs 26A that are upturned from opposite sides of base plate 24A, as in the embodiment of FIG. 5, and a pair of elongated arms 36 that extend generally longitudinally from the sides of base plate 24A opposite the sides from which ribs 26A are upturned.

Figure 9:
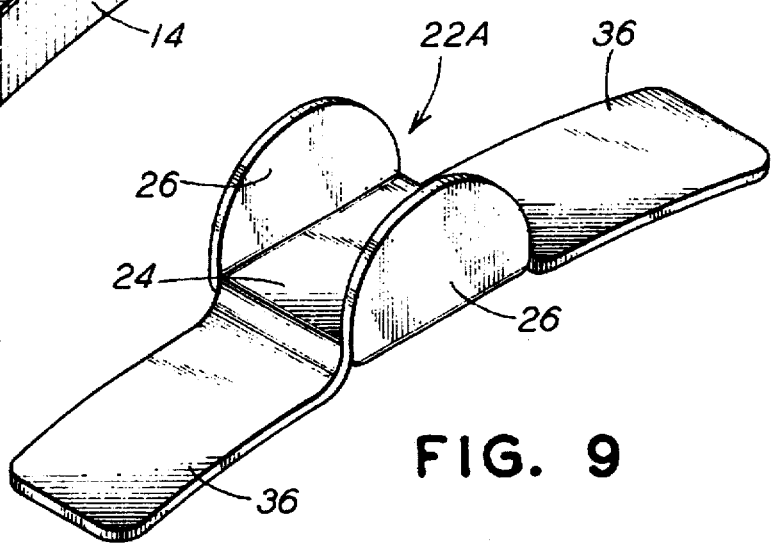
FIG. 9 is an enlarged axonometric view of the metal insert employed in the brake shoe of FIGS. 7 and 8.
Figure 8:
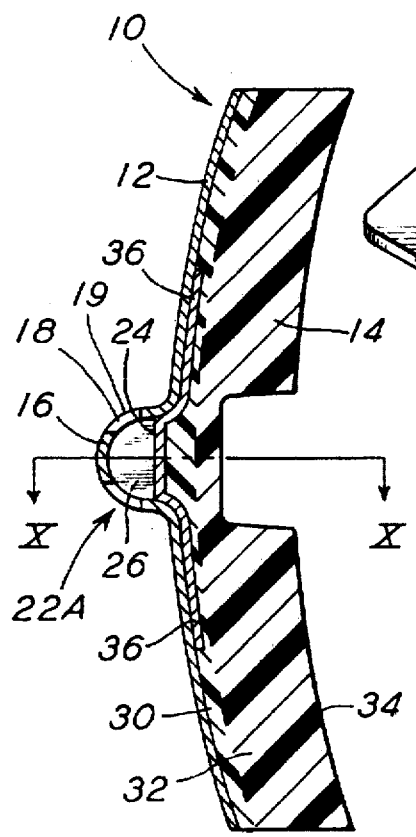
FIG. 8 is a sectional side elevation view of the brake shoe of FIG. 7.
Figure 10:
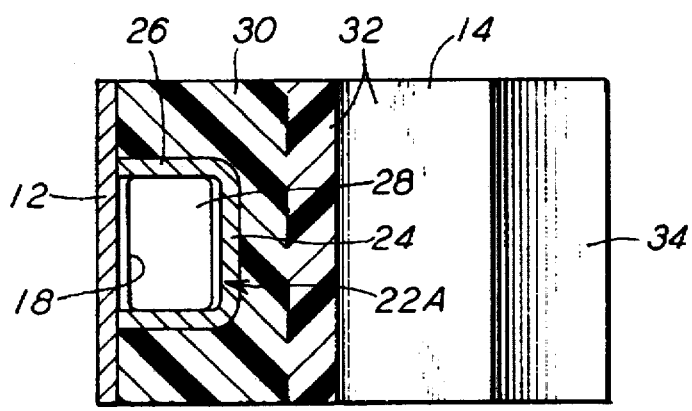
FIG. 10 is a section view taken along the lines X—X in FIG. 8.

As with the insert 22, it is preferred that this insert 22A also be formed by appropriate bending of a generally flat sheet of stamped metal into the desired shape shown in FIG. 9. In addition to the ribs 26A being upturned and having a shape corresponding to the contour of backing plate 12 within concavity 20, longitudinal arms 36 are shaped to conform to the radius where keybridge 16 converges with backing plate 12. Although not a requirement, it is preferred that the width of arms 36 be less than the width of backing plate 12. Insert 22A is located in concavity 20 similar to insert 22 with respect to keyholes 18. In addition, arms 36 engage the backing plate 12 beyond the area of concavity 20 to thus afford a greater surface area for bonding and further to permit welding the insert to the main structure of the metal backing plate in order to supplement the holding integrity of the chemical bond.

This insert 22A serves the same purpose as insert 22 in partitioning concavity 20 to provide a keyway therein and to reinforce the strengthening component of brake lining material that fills concavity 20.

I claim:

1. A brake shoe for braking engagement with the tread of a railroad car wheel comprising:

(a) a continuous metal backing plate formed intermediate the ends thereof with a keybridge having opposed legs upraised from one surface of said backing plate and interconnected by a bight portion to form a concavity in a surface of said backing plate opposite said one surface, said opposed legs each having a keyhole therein;

(b) a unitary metal insert disposed in said concavity comprising:

(i) a base plate extending between said opposite legs of said keybridge; and ii) a pair of laterally spaced-apart ribs integral with said base plate, said ribs being upturned therefrom to provide outward facing sides, the periphery of each of said ribs conforming in size and shape to said opposite surface of said backing plate within said concavity so as to be contiguous therewith, whereby said keybridge is reinforced, the area between said upturned ribs and said base forming an opening between said keyholes to provide a keyway through said keybridge in cooperation with said keyholes therein; and (c) a brake lining comprised of a composition material bonded to said opposite surface of said backing plate including the area within said concavity, and to said outward facing sides of said ribs, and to said base plate to secure said insert within said concavity and to fill said concavity in the area thereof adjacent the outward facing sides of said ribs to thereby reinforce said keybridge in conjunction with said insert.

2. A brake shoe as recited in claim 1, wherein said metal insert further comprises a pair of planar side arms extending longitudinally in opposite directions from said base plate, a corresponding first surface of each said side arm being engaged with said opposite surface of said backing plate outside the area of said concavity, said composition brake lining material being further bonded to at least said side arms of said metal insert.

3. A brake shoe as recited in claim 2, wherein said composition brake lining comprises:
   (a) binder stock bonded to said opposite surface of said backing plate including an area within said concavity that lies outside outwardly facing sides of said ribs, said metal insert being secured in place by said binder stock; and
   (b) friction stock bonded to said binder stock to provide a braking face With which said brake shoe is engageable with said railroad car wheel tread.

4. A brake shoe as recited in claim 3, wherein each said side arm has a lateral dimension less than the corresponding lateral dimension of said backing plate.

5. A brake shoe as recited in claim 1, where said spaced-apart ribs are located on opposite sides of said keyholes to partition said concavity in cooperation with said base plate whereby said opening in said filled concavity is void of said composition material to provide said keyway.

6. A brake shoe as recited in claim 5, wherein said upturned ribs are spaced-apart a distance less than the maximum lateral dimension of said concavity formed in said keybridge.

7. A brake shoe as recited in claim 1, wherein said composition brake lining material comprises:
   a) a relatively thin layer of binder stock bonded to said metal insert and to said opposite surface of said backing plate including the area within said concavity; and
   b) a relatively thick layer of friction stock bonded to said binder stock to provide a braking face with which said brake shoe is engageable with said railroad car wheel wheel tread.

* * * * *